(12) United States Patent
Watanabe et al.

(10) Patent No.: US 10,984,256 B2
(45) Date of Patent: Apr. 20, 2021

(54) RECOGNITION DEVICE, VEHICLE SYSTEM AND STORAGE MEDIUM

(71) Applicants: KABUSHIKI KAISHA TOSHIBA, Minato-ku (JP); Toshiba Electronic Devices & Storage Corporation, Minato-ku (JP)

(72) Inventors: Tomoki Watanabe, Tokyo (JP); Yan Song, Kanagawa (JP)

(73) Assignees: KABUSHIKI KAISHA TOSHIBA, Minato-ku (JP); Toshiba Electronic Devices & Storage Corporation, Minato-ku (JP)

(*) Notice: Subject to any disclaimer, the term of this patent is extended or adjusted under 35 U.S.C. 154(b) by 0 days.

(21) Appl. No.: 16/126,355

(22) Filed: Sep. 10, 2018

(65) Prior Publication Data
US 2019/0286917 A1 Sep. 19, 2019

(30) Foreign Application Priority Data
Mar. 19, 2018 (JP) .............................. JP2018-051486

(51) Int. Cl.
*G06K 9/00* (2006.01)
(52) U.S. Cl.
CPC ..... *G06K 9/00791* (2013.01); *G06K 9/00818* (2013.01)
(58) Field of Classification Search
CPC ................ G06K 9/00791; G06K 9/00818
See application file for complete search history.

(56) References Cited

U.S. PATENT DOCUMENTS

| 2015/0278615 | A1  | 10/2015 | Ogawa |
| 2018/0188060 | A1* | 7/2018  | Wheeler .................. G06K 9/44 |
| 2018/0349716 | A1* | 12/2018 | Park ...................... G06K 9/6215 |
| 2020/0158519 | A1* | 5/2020  | McGavran .............. H04W 4/40 |

FOREIGN PATENT DOCUMENTS

| JP | 2017-516197 A     | 6/2017     |
| KR | 10-2014-0061156 A | 5/2014     |
| KR | 10-2016-0093464 A | 8/2016     |
| WO | WO 2016/155371    | * 10/2016  |

OTHER PUBLICATIONS

A machine translated English version of WO 2016/155371. (Year: 2016).*
Andrew G. Howard et al., "MobileNets: Efficient Convolutional Neural Networks for Mobile Vision Applications", arXiv:1704.04861v1, Apr. 17, 2017, 9 pages.
(Continued)

*Primary Examiner* — Ruiping Li
(74) *Attorney, Agent, or Firm* — Oblon, McClelland, Maier & Neustadt, L.L.P.

(57) ABSTRACT

According to one embodiment, a recognition device includes a hardware processor. The hardware processor is configured to identify presence or absence of composition elements of a target from input observation data, acquire setting information indicative of a relationship between a type and composition elements, and identify a type of the target based on the setting information acquired and the presence or absence of the composition elements.

13 Claims, 10 Drawing Sheets

(56) References Cited

OTHER PUBLICATIONS

Forrest N. Iandola et al., "Squeezenet: Alexnet-Level Accuracy With 50X Fewer Parameters and <0.5MB Model Size", arXiv:1602.07360v4, Nov. 4, 2016, pp. 1-13.
Wei Liu et al., "SSD: Single Shot MultiBox Detector", arXiv:1512.02325v5, Dec. 29, 2015, pp. 1-17.
Joseph Redmon et al., "You Only Look Once: Unified, Real-Time Object Detection", arXiv:1506.02640v5, May 9, 2015, 10 pages.
Zhongchao Shi et al., "Development of an Automatic Road Sign Extraction Method by Fusion of Stereo Images and Laser Data", Journal of the Japan Society of Photogrammetry and Remote Sensing (JSPRS) (vol. 49, No. 2), 2010, pp. 75-82 w/ Machine translation (20 pages).
Satoshi Yatsumonji et al., "Road Sign Recognition System by template matching", The Transactions of The Institute of Electrical Engineers of Japan (vol. 120••C, No. 1), Jan. 2000, pp. 174-175 w/ Machine translation (9 pages).

\* cited by examiner

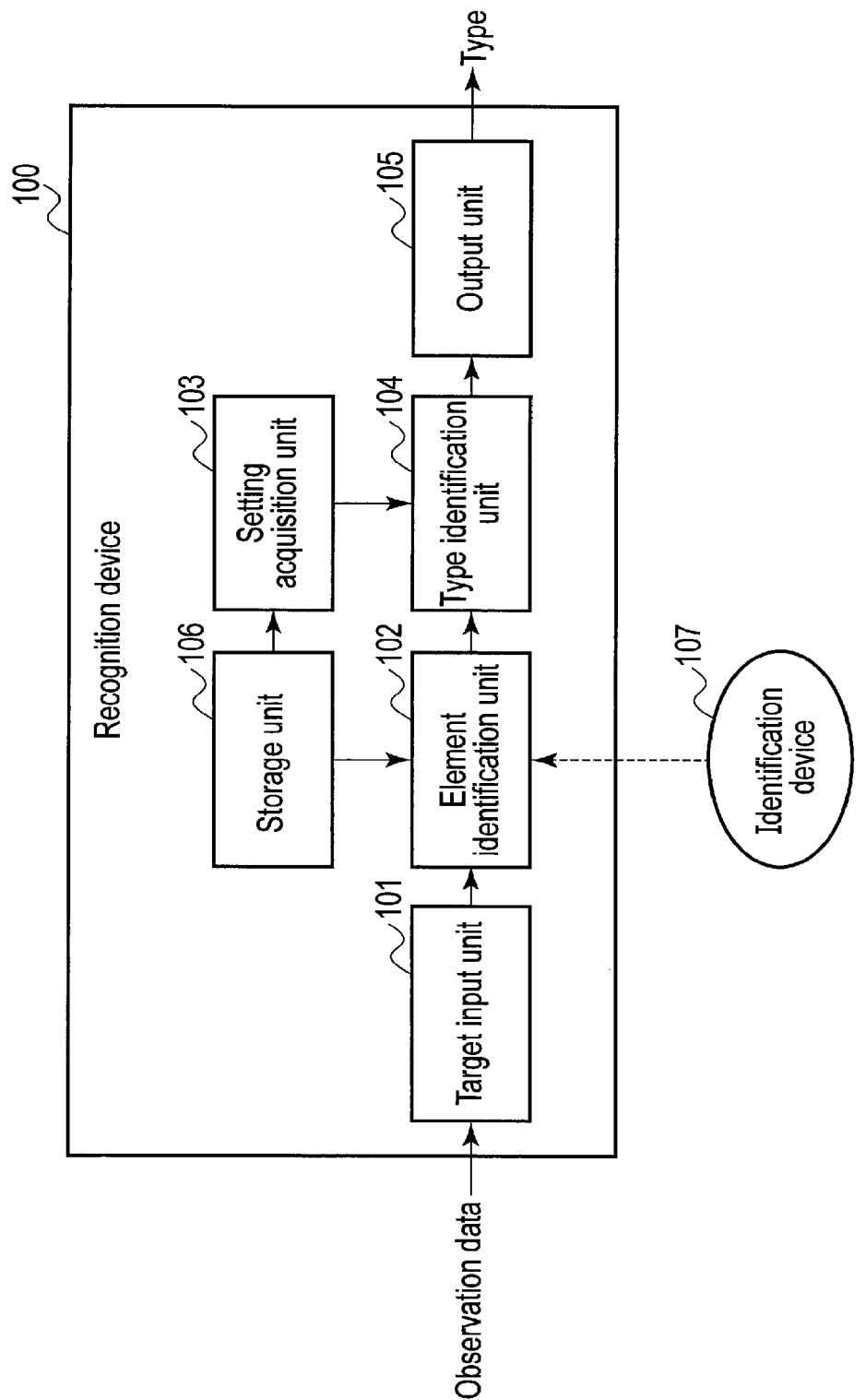
F I G. 1

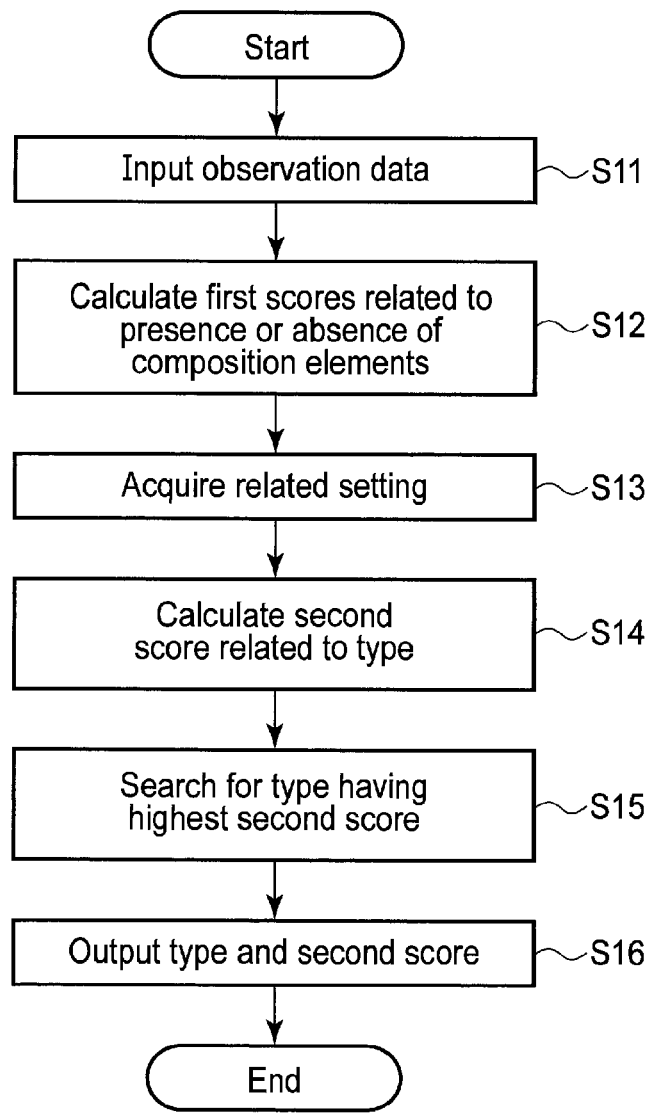
F I G. 4

| Types \ Composition elements | 10 | ... | 80 | 90 | SPEED | LIMIT | MAXIMUM | MINIMUM | ... |
|---|---|---|---|---|---|---|---|---|---|
| Maximum speed 80km/h | − | ⋮ | + | − | + | + | * | − | ⋮ |
| Maximum speed 80km/h | − | ⋮ | + | − | * | * | + | − | ⋮ |
| Maximum speed 90km/h | − | ⋮ | − | + | * | * | + | − | ⋮ |
| ... | ... | ... | ... | ... | ... | ... | ... | ... | ... |
| Minimum speed 10km/h | + | ⋮ | − | − | + | * | − | + | ⋮ |
| ... | ... | ... | ... | ... | ... | ... | ... | ... | ... |

+ : Included
− : Not included
* : Either case

FIG. 6

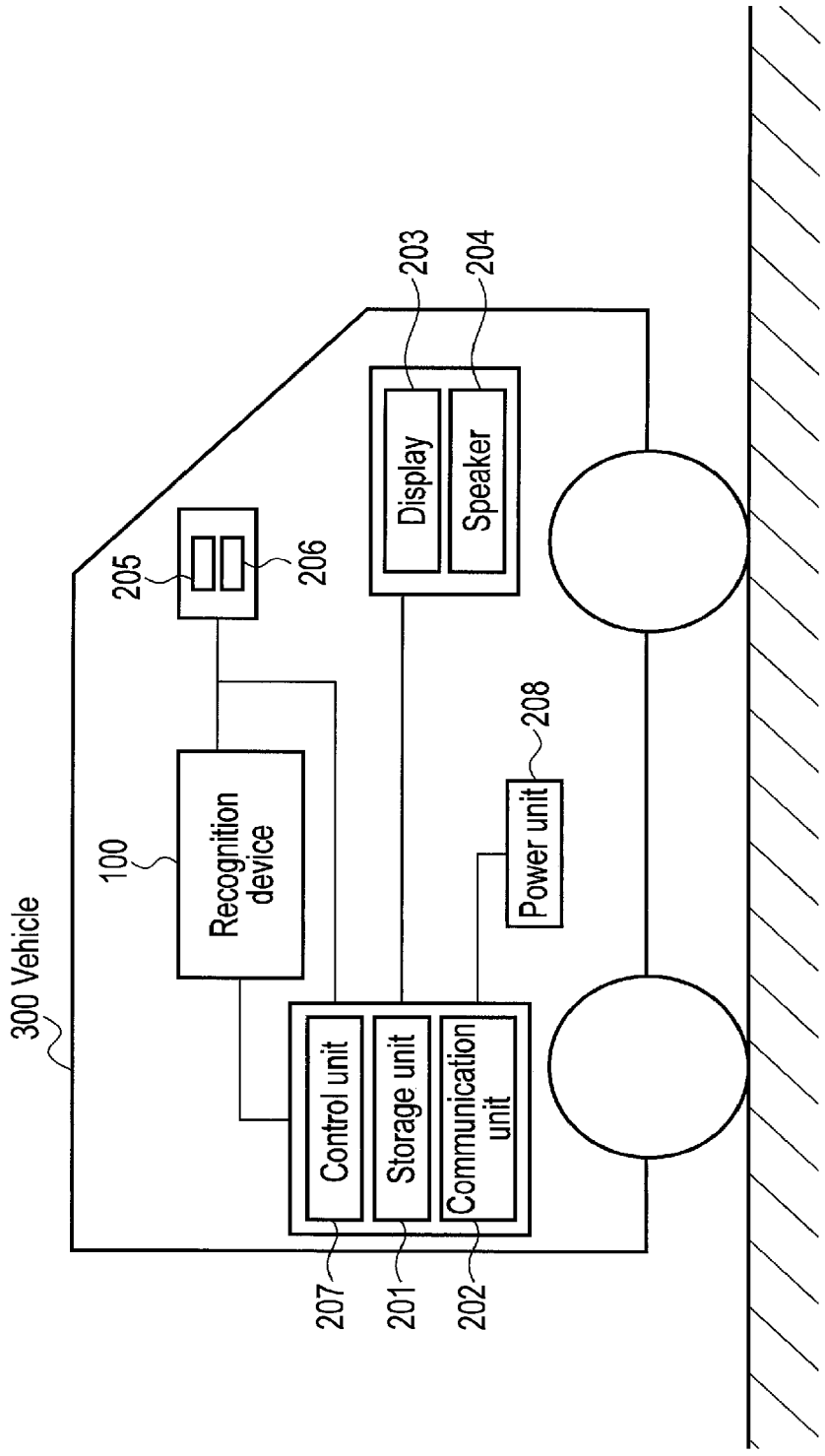
F I G. 9

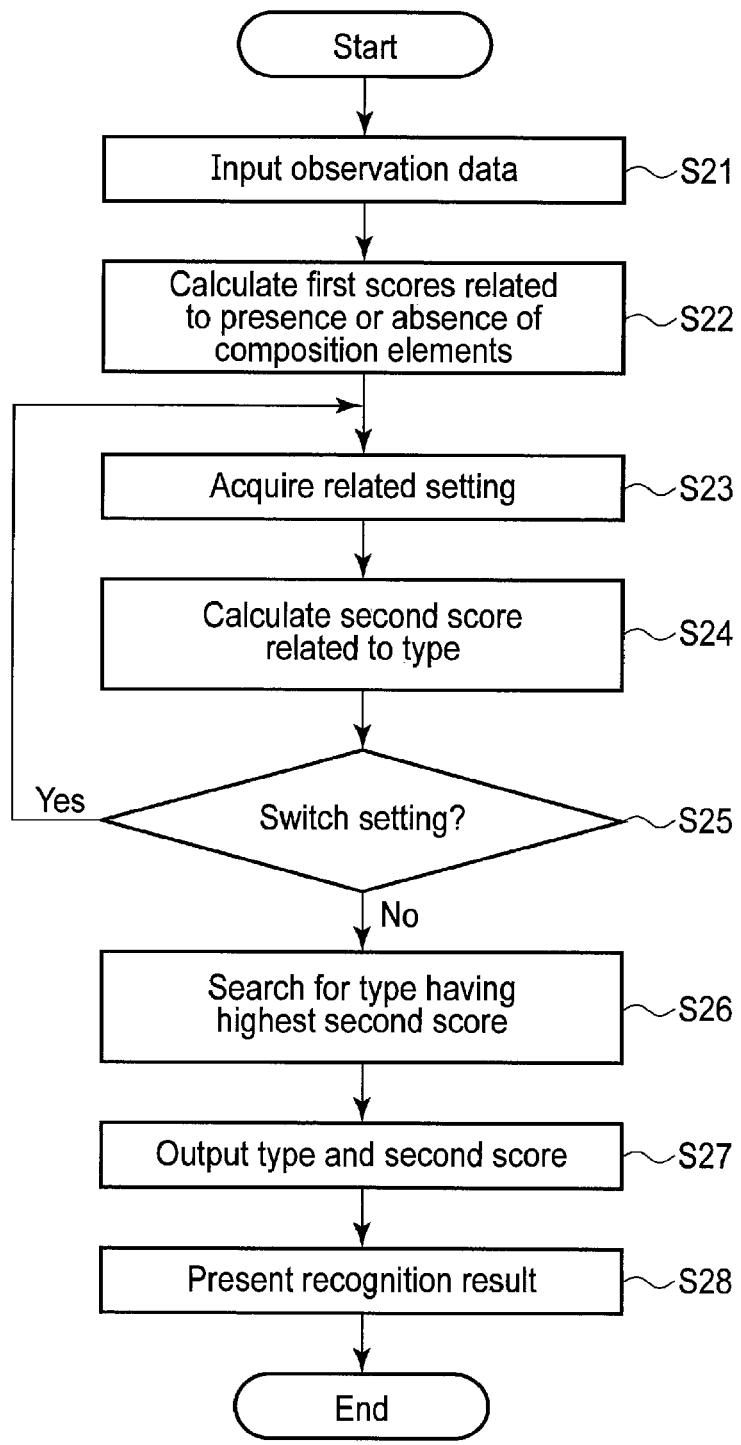
F I G. 10

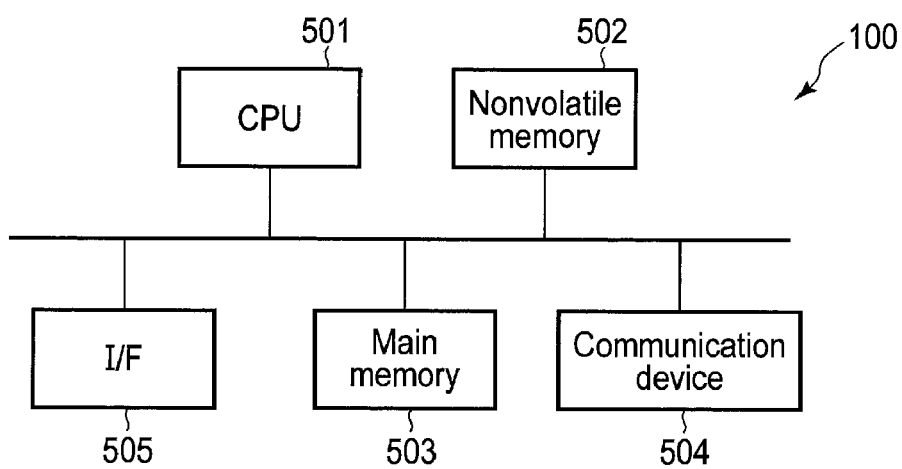
F I G. 11

RECOGNITION DEVICE, VEHICLE SYSTEM AND STORAGE MEDIUM

CROSS-REFERENCE TO RELATED APPLICATIONS

This application is based upon and claims the benefit of priority from Japanese Patent Application No. 2018-051486, filed Mar. 19, 2018, the entire contents of which are incorporated herein by reference.

FIELD

Embodiments described herein relate generally to a recognition device, a vehicle system and a storage medium.

BACKGROUND

For example, in the case of recognizing a traffic sign from an image, a neural network is generally used. When the image of a traffic sign targeted for recognition is input to the neural network, the type of the traffic sign corresponding to the image is output as a recognition result.

The neural network requires a large amount of information to recognize various targets, and an amount of calculation is also large. Further, to make the neural network additionally learn a new target, various parameters related to the target have to be input to the neural network.

BRIEF DESCRIPTION OF THE DRAWINGS

FIG. 1 is a block diagram showing the functional configuration of a recognition device according to a first embodiment.

FIG. 4 is a flowchart showing the process operations of the recognition device in the first embodiment.

FIG. 6 is a diagram showing the type of an indication and the presence or absence of composition elements in the first embodiment.

FIG. 9 is a diagram schematically showing a configuration in a case in which the recognition device is mounted on a vehicle in the second embodiment.

FIG. 10 is a flowchart showing the process operations of the recognition device in the vehicle system in the second embodiment.

FIG. 11 is a diagram showing an example of a hardware configuration of the recognition device in the first and second embodiments.

DETAILED DESCRIPTION

Figure 2:
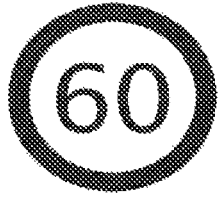
FIG. 2 is a diagram showing an example of traffic signs and composition elements in the first embodiment.

Embodiments will be described hereinafter with reference to the accompanying drawings.

In general, according to one embodiment, a recognition device includes a hardware processor. The hardware processor is configured to identify presence or absence of composition elements of a target from input observation data, acquire setting information indicative of a relationship between a type and composition elements, and identify a type of the target based on the setting information acquired and the presence or absence of the composition elements.

In the description below, approximately or substantially the same functions and composition elements are denoted by the same reference numbers and are explained if necessary.

First Embodiment

FIG. 1 is a block diagram showing the functional configuration of a recognition device according to a first embodiment.

A recognition device 100 in the present embodiment is a device which recognizes the type of a target supplied, for example, by an image captured by a camera, etc., based on the composition elements of the target. The "target" here is an indication which gives information by a picture, a character or the like, and a sign is also included.

The recognition device 100 comprises a target input unit 101, an element identification unit 102, a setting acquisition unit 103, a type identification unit 104, an output unit 105 and a storage unit 106.

The target input unit 101 inputs observation data on a target. The element identification unit 102 is used as the first identification unit. This element identification unit 102 uses the identification device 107 which has been trained in composition elements related to various targets by machine learning, and identifies the presence or absence of the composition elements of a target from the observation data input by the target input unit 101.

The setting acquisition unit 103 acquires setting information indicative of the relationship between a type and presence or absence of composition elements. The type identification unit 104 is used as the second identification unit. The type identification unit 104 identifies the type of a target based on the setting information acquired by the setting acquisition unit 103 and the composition elements identified by the element identification unit 102.

The output unit 105 outputs an identification result of the type identification unit 104. The storage unit 106 stores various information necessary for identification processes of the element identification unit 102 and the type identification unit 104 which will be described later.

Here, a traffic sign will be taken as an example of the identification, and the relationship between an indication and composition elements will be described.

FIG. 2 is a diagram showing an example of traffic signs and composition elements. The first column shows traffic signs, and the second column shows composition elements thereof.

The first row and the second row show speed limit signs used in Japan. Although color is not expressed in the drawing, these traffic signs are composed of a red circle and a black character in reality.

The traffic sign in the first row indicates that the upper speed limit is 60 kilometers per hour and is composed of a red circle and a number "60". The traffic sign in the second row indicates that the lower speed limit is 30 kilometers per hour and is composed of a red circle, a number "30" and an underline.

With the knowledge of these rules, for example, a traffic sign composed of a red circle and a number "40" can be understood as an indication that the upper speed limit is 40 kilometers per hour, or a traffic sign composed of a red circle, a number "10" and an underline can be understood as an indication that the lower speed limit is 10 kilometers per hour, even if the traffic sign has never been seen before.

The third to fifth rows show speed limit signs used in Europe and the United States. They are also designed by the combination of composition elements.

Although a traffic sign is taken as an example, the indication to be targeted by the present invention is not limited to a traffic sign and may be a road marking painted on a road surface or a traffic light which gives information by the color or shape of the light.

Other than those described above, all notices designed to give information to people such as guide signs which tell the locations of various counters, emergency exits and the like, notices which tell cautions and prohibitions directed to the users of facilities such as smoking permission/prohibition are targeted.

Figure 3:
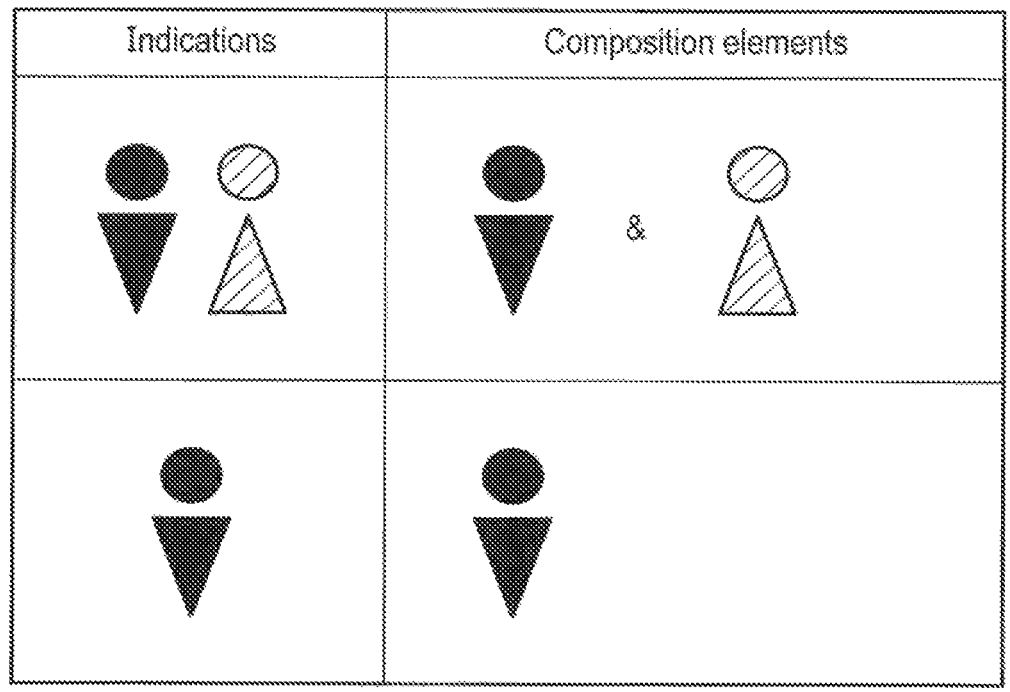
FIG. 3 is a diagram showing an example of guide signs in the first embodiment.

FIG. 3 shows an indication which shows the location of a toilet in a shop, etc., as an example of the guide sign.

The indication in the first row shows the location of a men's toilet and a women's toilet by a symbol for men and a symbol for women. The indication in the second row shows the location of a men's toilet by the symbol for men. Blue or yellow is often used for the symbol for men, and red or pink is often used for the symbol for women.

In general, when a convolutional neutral network is used for recognizing, for example, a traffic sign, the type of a traffic sign having the greatest weight is output as a recognition result. However, since the variety of traffic signs is extremely wide, the same number of weights as the number of types of traffic signs, that is, a large number of weights has to be output in a normalization layer. As a result, an amount of calculation becomes large.

Even though the variety of traffic signs is extremely wide, people can understand the meanings without recognizing all the traffic signs individually. It is because indications such as traffic signs and guideboards are designed to give information to people and follow a rule to use the same color or the same picture as a composition element for the same type of indications, and people have the knowledge of the rule.

By focusing attention on such a rule, the recognition device 100 of the present embodiment aims to effectively recognize an indication such as a traffic sign as a target.

The process operations of the recognition device 100 will be described below.

FIG. 4 is a flowchart showing the process operations of the recognition device 100.

Firstly, the target input unit 101 inputs observation data on a target (Step S11). The observation data are, for example, an image of an indication acquired from a camera and coordinate information indicative of the position of an indication, an image of an indication portion which is clipped in advance based on coordinate information, and the like.

Further, the observation data may be acquired through a radar, a sensor or the like. Alternatively, the observation data may be acquired through a communication medium or a recording medium.

Next, the element identification unit 102 identifies the presence or absence of composition elements of an indication from the observation data by using the previously-trained identification device 107. As illustrated in FIGS. 2 and 3, the composition elements are shapes, characters and positions thereof used in common for indications of the same meaning.

Here, for example, a neural network is used as the identification device 107. In particular, a convolutional neural network (CNN or ConvNet) which provides high identification performance should preferably be used. Other than that, a support vector machine (SVM) or the like may be used.

Since the convolutional neural network and the support vector machine are widely known, detailed description thereof will be omitted.

Parameters of the identification device 107 are loaded into the element identification unit 102 from the storage unit 106 or from the outside by communication in advance or are sequentially loaded from the storage unit 106 during the process.

The element identification unit 102 calculates a score (hereinafter referred to as the first score) indicative of the possibility of presence for each of the composition elements of an indication by using the identification device 107 (Step S12).

The first score should preferably be normalized within a range from 0 to 1 and also be normalized such that the sum of "a score corresponding to presence" and "a score corresponding to absence" becomes 1, because the first score can be handled more easily in the type identification unit 104 which will be described later.

The training of the identification device 107 will be described below.

The identification device 107 is trained by machine learning using a sample of observation data which serves as an input and a sample of data on the presence or absence of composition elements which serves an output.

Note that meanings are not necessarily in a one-to-one correspondence with shapes and characters.

For example, the traffic signs in the fourth and fifth rows shown in FIG. 2 both indicate that the upper speed limit is 80 miles but are expressed by different characters. Therefore, the component element identified by the identification device 107 is a set of categories based on similarity in shape, character, color or position. This method has an advantage in improving the identification performance of the identification device 107 in a case in which composition elements have similar appearances.

As another method, it is possible to categorize composition elements by grouping composition elements of the same meaning together regardless of shape, character, color and position.

For example, the composition elements shown in the first and second rows of FIG. 2 are categorized as those which mean speed limits in Japan. This method has an advantage in simplifying the description of setting information used in the type identification unit 104 which will be described later because the variety of composition elements decreases.

In any case, indications are categorized in such a manner as to be expressed by the combinations of composition elements. If the number of types of composition elements is smaller than the number of all types of indications, the calculation amount of the identification device 107 can be significantly reduced.

Figure 5:
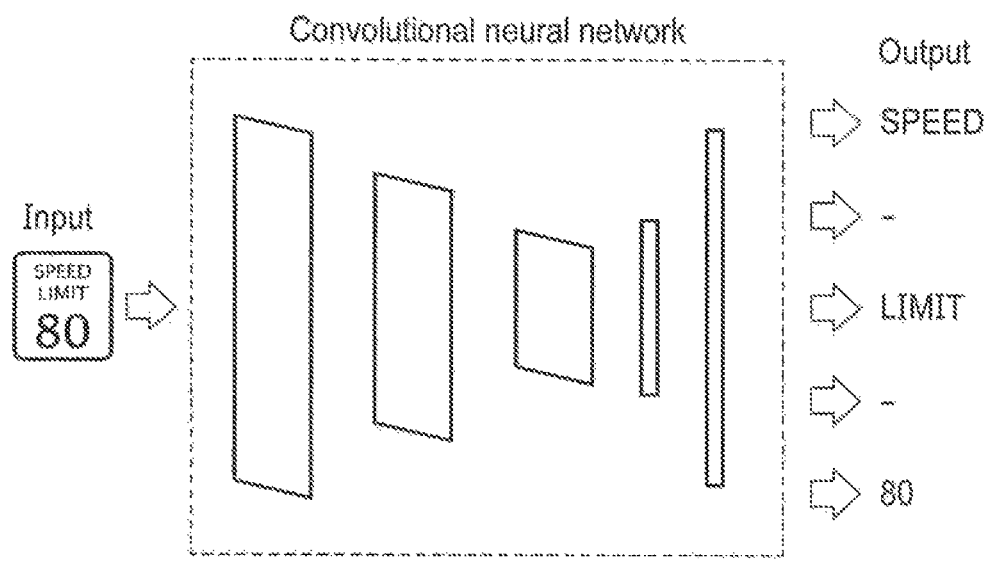
FIG. 5 is a diagram showing an input-output relationship in a case in which a convolutional neural network is used as an identification unit in the first embodiment.

An input-output relationship in a case in which the convolutional neural network is used as the identification device 107 is shown in FIG. 5.

In the convolutional neural network, a method called backpropagation is used for training. This is a method of inputting observation data or a feature amount calculated from observation data, and modifying the weight of a convolution layer to reduce an error between a value calculated by repetitive computations of the convolution layer, etc., and a target output value.

Usually, in the case of making the convolutional neural network trained in information on various indications (including signs) as samples, outputs are the types of indications. That is, in the case of the traffic sign in the first row of FIG. 2, for example, the entire traffic sign is output as an identification result. Therefore, to eliminate errors between input and output, training using a large amount of samples will be required.

On the other hand, in the present embodiment, only the first score is calculated for each of the composition elements of an indication by sharing a part of the convolutional neural network. Therefore, the weight of the layer can be effectively modified by a small number of samples.

Next, the setting acquisition unit 103 acquires setting information indicative of the relationship between the type of an indication and the presence or absence of composition elements from the storage unit 106 or from the outside by communication (Step S13).

The "relationship between the type of an indication and the presence or absence of composition elements" here is a rule which defines the combination of the presence or absence of composition elements for each of the types of indications. As shown in FIG. 6, rules which define the relationships between composition elements which are included and composition elements which are not included, respectively, for the types of indications are expressed in a table. Some composition elements may be included in one case or may not be included in the other case.

In FIG. 6, a speed limit sign is taken as an example of the type of an indication, a rule of a combination of composition elements thereof is presented in the form of a table.

For example, regarding a traffic sign having the meaning of "Maximum speed 80 km/h" shown in the fourth row of FIG. 2, a number "10": Included, a number "80": Not included, characters "SPEED": Included, characters "LIMIT": Included, characters "MAXIMUM": Either case, etc., are defined as composition elements.

The reason why the characters "MAXIMUM" are set as "Either case" is because another traffic sign having the same meaning is present in the fifth row of FIG. 2.

The setting is not necessarily expressed in the form of a table such as that shown in FIG. 6 and may be expressed in the form of a list, a decision tree or the like.

Next, the type identification unit 104 calculates a score related to a type (hereinafter referred to as the second score) from the first scores added to the composition elements of an indication identified by the element identification unit 102 based on the setting information indicative of the relationship acquired by the setting acquisition unit 103 (Step S14)

Figure 7:
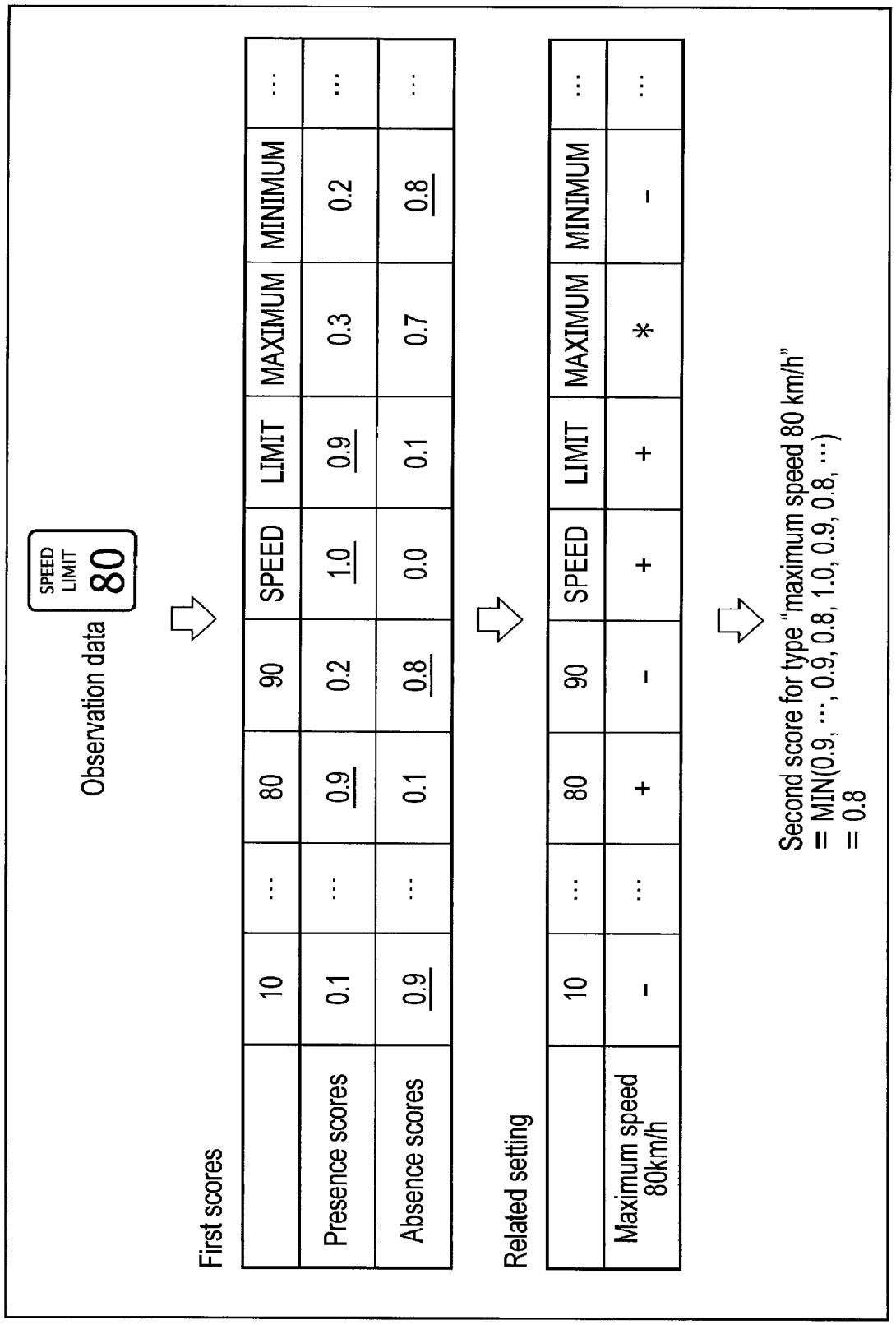
FIG. 7 is a diagram showing a method of calculating the second score in the first embodiment.

A calculation method of the second score will be described with reference to FIG. 7.

The first score indicative of presence is added to each of the compositions elements identified by the element identification unit 102. FIG. 7 shows the case of recognizing the traffic sign having the meaning of "Maximum speed 80 km/h" shown in the fourth row of FIG. 2 as an example.

In the recognition result of the element identification unit 102, the first score (presence score) for the presence of the number "10" is 0.1, and the first score (absence score) for the absence of a number "10" is 0.9. In the example of the table shown in FIG. 6, since a setting "−" indicating that the number "10" is not included is made, 0.9, which is the absence score, is used for calculating the second score in the case of the number "10".

Further, the first score (presence score) for the presence of the number "80" is 0.9, and the first score (absence score) for the absence of the number "80" is 0.1. In the example of the table shown in FIG. 6, since a setting "+" indicating that the number "80" is included is made, 0.9, which is the presence score, is used for calculating the second score in the case of the number "80".

The first score related to a composition element (see "*" of FIG. 6) which is either present or absent is not used for calculating the second score.

As described above, the type identification unit 104 acquires the first scores for the composition elements of the indication acquired as the recognition results of the element identification unit 102 with reference to the table of FIG. 6, calculates the smallest value among the first scores, and sets the smallest value as the second score.

An advantage in using the smallest value of the first scores as the second score is to limit excessive recognition. According to the usage, the second score may be calculated, for example, by using the largest value or the weighted sum. The use of the largest value has an advantage in preventing non-detection, and the use of the weighted sum has an advantage in improving robustness with respect to noise of the first score.

The type identification unit 104 repeats such a calculation for each of indications serving as recognition targets, and finally sets the type of an indication having the highest second score or the type of an indication having a value exceeding a preset threshold value as an identification result (Step S15).

The output unit 105 outputs the type of an indication determined in the type identification unit 104 and the corresponding second score. In above-described Step S15, when a type is determined by using a threshold value, a plurality of identification results may be output in some cases.

According to the first embodiment, a target indication can be effectively recognized with a small calculation amount at a recognition ratio similar to that of a convolutional neural network simply by setting the relationship between the type of an indication and the presence or absence of composition elements in advance. In this case, even if the number of types of indications to be targeted increases, the situation can be flexibly handled simply by increasing the type items of the table shown in FIG. 6.

Second Embodiment

Next, a second embodiment will be described based on the assumption that the recognition device described above in the first embodiment is mounted on a vehicle such as a car.

Figure 8:
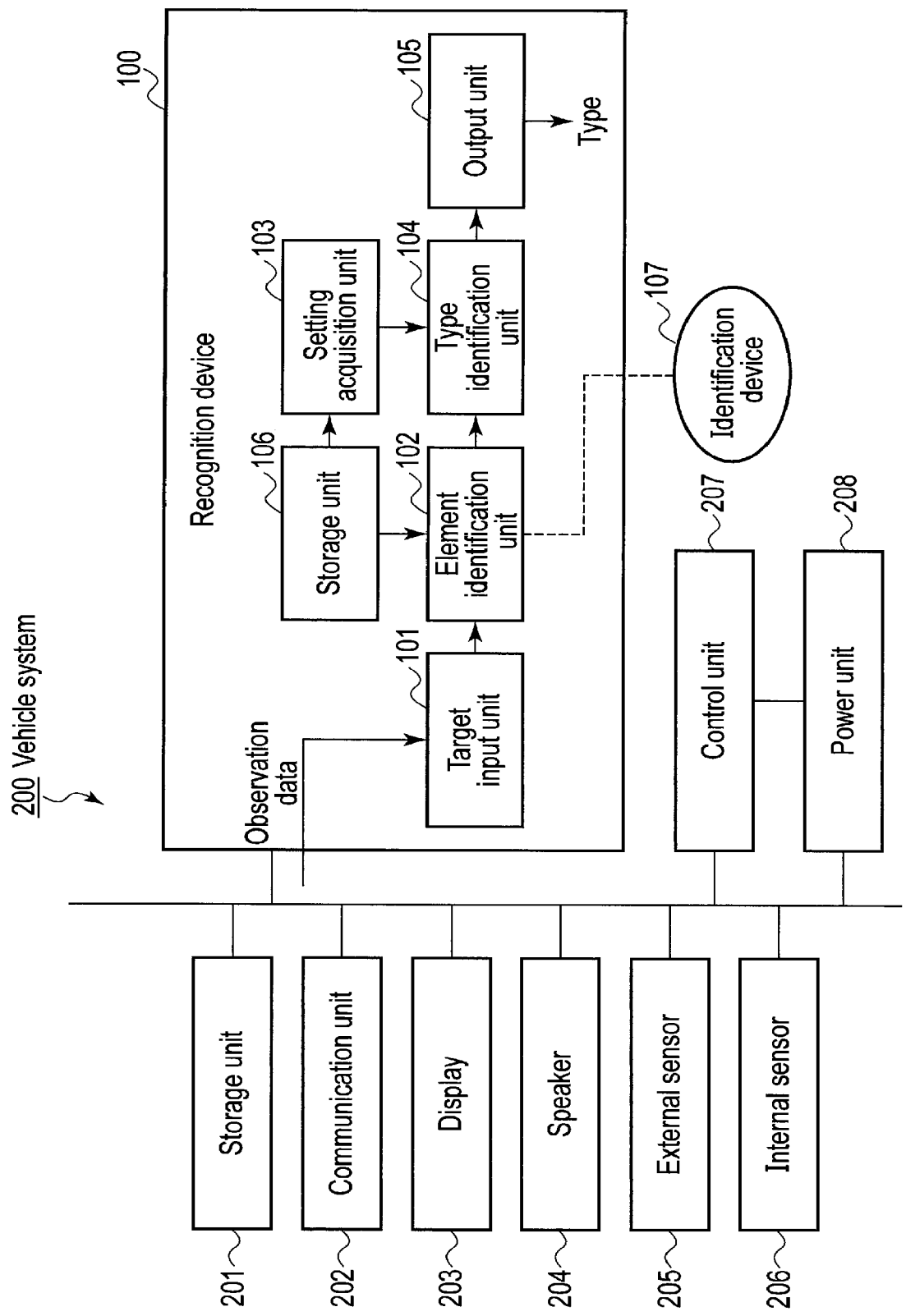
FIG. 8 is a block diagram showing the functional configuration of a vehicle system according to a second embodiment.

FIG. 8 is a block diagram showing the functional configuration of a vehicle system according to the second embodiment. The reference number 200 in the drawing indicates the entire vehicle system.

The vehicle system 200 is configured to target one or all of traffic signs, road markings, traffic lights, etc., provided on roads, etc., and to recognize them by the recognition device 100.

The recognition device 100 comprises the target input unit 101, the element identification unit 102, the setting acquisition unit 103, the type identification unit 104, the output unit 105 and the storage unit 106. Since these configurations are similar to those of the above-described first embodiment, detailed description thereof will be omitted.

The vehicle system 200 comprises a storage unit 201, a communication unit 202, a display 203, a speaker 204, an external sensor 205, an internal sensor 206, a control unit 207, a power unit 208, etc., as the vehicle-related composition elements. They are directly or indirectly connected to the recognition device 100.

The storage unit 201 stores various information required for vehicle control. The observation data and the related setting information, etc., may be stored in the storage unit 201 and may be appropriately read in accordance with an instruction from the recognition device 100.

The communication unit 202 performs wireless or wired data communication with the outside. Information required for the recognition device 100 may be acquired from the outside via the communication unit 202.

The display 203 and the speaker 204 are used as presentation units which present various information required for vehicle operation to the operator.

The external sensor 205 includes, for example, a camera, a GPS, a radar and the like.

The internal sensor 206 includes, for example, a vehicle speed meter, a timer, a thermometer, an input sensor of a touch panel, etc., and the like.

The control unit 207 performs control of the entire vehicle including the drive control of the power unit 208.

The drive unit 208 includes an engine, etc.

FIG. 9 schematically shows a configuration in a case in which the recognition device 100 is mounted on a vehicle 300 such as a car, etc. The reference numbers in the drawing correspond to those in FIG. 8.

The process operations of the recognition device 100 mounted on the vehicle 300 will be described below.

FIG. 10 shows a flowchart showing the process operations of the recognition device 100 in the vehicle system 200. The process from Step S21 to Step S24 is similar to the process from Step S11 to Step S14 of above-described FIG. 4, and therefore detailed description thereof will be omitted.

In the second embodiment, the setting information (table) acquired in Step S23 is dynamically switched in correspondence with an environmental change during driving (Step S25).

For example, in correspondence with a rule which is changed according to a country, a region, a road type (such as an urban area road, an ordinary road and an expressway), a time zone and the like, and a large number of tables are prepared in the storage unit 106 (or in the storage unit 201 on the vehicle side). These tables are dynamically changed according to environmental conditions during the driving of the vehicle.

The environmental conditions include an indication showing the boundary of a region. Further, the environmental conditions include a traveling speed detected by the vehicle speed meter, a current location detected by the GPS, etc., current time measured by the timer, a user operation on the touch panel, etc., installed in a driver sheet, etc., and the like.

By appropriately switching the related setting tables according to the environmental conditions, targets acquired from the observation data during driving can be accurately recognized.

The subsequent process is similar to the process of the above-described first embodiment. That is, the second score related to the type is calculated for the composition elements of an indication acquired as recognition results of the element identification unit 102, and eventually the type of an indication having the highest second score or the type of an indication having a value exceeding a threshold value is output as a recognition result (Steps S26 and S27).

The identification result output from the recognition device 100 is supplied to the control unit 207 provided in the vehicle 300. The control unit 207 presents the recognition result to the operator of the vehicle 300 as follows (Step S28).

That is, for example, the recognition result is assumed to be a speed limit sign. The control unit 207 compares the current vehicle speed with the regulation speed of the traffic sign acquired as the recognition result, and if the current vehicle speed exceeds the regulation speed, the control unit 207 notifies the operator that the operator exceeds the regulation speed by a sound or an image through the display 203 or the speaker 204. Alternatively, the control unit 207 controls the drive of the power unit 208 to conform the current vehicle speed to the regulation speed.

Here, the presentation method or the drive control may be modified by using the second score included in the recognition result. For example, if the second score is lower than the preset value, recognition may be false, and therefore only an image is presented.

On the other hand, if the second score is high and the possibility of false recognition is low, presentation is performed by an image and a sound. Further, according to the value of the second score, the volume or tone of a sound may be changed in a stepwise manner or the position or size of an image may be changed in a stepwise manner.

Still further, if the second score is higher than the present value, the control amount of the drive unit 208 may be increased to make the current speed reach the regulation speed in a short time.

According to the second embodiment, it is possible, by applying the recognition device of the above-described first embodiment to the vehicle system, to recognize a target such as a traffic sign, a road marking or a traffic light while adapting to an environmental change during the driving of a vehicle. By presenting the recognition result to the operator of the vehicle, driving safety can be ensured.

A vehicle system has been taken as an example in the above-described second embodiment, but for example, the recognition device is also applicable to a movable object other than a vehicle such as an aircraft or an unmanned flying object.

(Hardware Configuration)

FIG. 11 is a diagram showing an example of the hardware configuration of the recognition device 100 in the above-described first and second embodiments.

The recognition device 100 comprises a CPU 501, a nonvolatile memory 502, a main memory 503, a communication device 504, an interface (I/F) 505, and the like.

The CPU 501 is a hardware processor which controls the operations of various components within the recognition device 100. The CPU 501 executes various programs which are loaded from the nonvolatile memory 502, which is a storage device, to the main memory 503.

The programs executed by the CPU 501 include not only an operating system (OS) but also a program for executing the process operations shown in FIGS. 4 and 10 (hereinafter referred to as a recognition process program).

Further, the CPU 501 also executes, for example, a basic input/output system (BIOS) which is a program for hardware control.

Some or all of the target input unit 101, the element identification unit 102, the setting acquisition unit 103, the type identification unit 104 and the output unit 105 shown in FIGS. 1 and 8 are realized by causing the CPU 501 (computer) to execute the recognition process program.

The recognition process program may be stored in and distributed by a computer-readable recording medium (for example, the nonvolatile memory 502) or may be downloaded to the recognition device 100 through the network.

Some or all of the target input unit 101, the element identification unit 102, the setting acquisition unit 103, the type identification unit 104 and the output unit 105 may be realized by hardware such as an integrated circuit (IC) or may be realized as configurations of the combination of software and hardware.

The communication device 504 is, for example, a device configured to execute wired or wireless communication with an external device.

The I/F 505 executes an input/output process of data to/from an external device. The I/F 505 is used for incorporating the recognition device 100 to the vehicle system 200 shown in FIG. 8.

Only the CPU 501, the nonvolatile memory 502, the main memory 503, the communication device 504 and the I/F 505 are illustrated in the example shown in FIG. 11, but the recognition device 100 may comprise, for example, other storage devices such as a hard disk drive (HDD) and a solid state drive (SSD) or may comprise an input device and an output device, etc.

According to at least one of the above-described embodiments, a recognition device, a vehicle system and a recognition method which can effectively recognize a target indication at a recognition ratio similar to that of a neural network with a small calculation amount.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recognition device comprising:
a hardware processor; and
a memory configured to store instructions executable by the hardware processor,
wherein the hardware processor is configured to:
identify presence or absence of composition elements of an indication to be recognized from input observation data;
calculate first scores related to the presence or absence of the composition elements of the identified indication by using an identification device that has been trained in composition elements related to various indications by machine learning;
acquire setting information indicative of a relationship between a type of an indication and presence or absence of composition elements from the memory or outside the memory;
calculate a second score related to a type of the indication based on the acquired setting information and the first scores, wherein the second score is calculated based on a smallest value of the first scores; and
identify the type of the indication based on the second score.

2. The recognition device of claim 1, wherein
the identification device includes a neural network, and
the calculation of the first scores is shared with a part of the neural network for the composition elements of the indication.

3. The recognition device of claim 1, wherein in the setting information, a relationship of composition elements which are included and composition elements which are not included is defined for each of types.

4. The recognition device of claim 1, wherein the composition elements include categories based on similarity in shape, character, color or position.

5. The recognition device of claim 1, wherein the composition elements are categories based on coincidence in expressed meaning.

6. A vehicle system comprising a recognition device that recognizes an indication related to a vehicle, wherein the recognition device comprises:
a hardware processor; and
a memory configured to store instructions executable by the hardware processor,
wherein the hardware processor is configured to:
identify presence or absence of composition elements of the indication to be recognized from input observation data;
calculate first scores related to the presence or absence of the composition elements of the identified indication by using an identification device that has been trained in composition elements related to various indications by machine learning;
acquire setting information indicative of a relationship between a type of an indication and presence or absence of composition elements from the memory or outside the memory;
calculate a second score related to a type of the indication based on the acquired setting information and the first scores, wherein the second score is calculated based on a smallest value of the first scores;
identify the type of the indication based on the second score; and
output the identified type of the indication.

7. The vehicle system of claim 6, wherein the indication includes at least one of a traffic sign, a road marking and a traffic light.

8. The vehicle system of claim 6, wherein the setting information is switched according to environmental conditions of the vehicle.

9. The vehicle system of claim 8, wherein the environmental conditions include a current location of the vehicle, a traveling speed of the vehicle or current time.

10. The vehicle system of claim 6, wherein the hardware processor is further configured to present the type of the indication to an operator of the vehicle.

11. The vehicle system of claim 10, wherein the hardware processor is further configured to dynamically change a method of presenting the identified type of the indication to the operator of the vehicle based on the identification result.

12. The vehicle system of claim 6, wherein the hardware processor is further configured to control an operation of the vehicle based on the type of the indication.

13. A non-transitory computer-readable storage medium storing instructions that, when executed by hardware processors of a device having a memory, cause the device to:
identify presence or absence of composition elements of an indication to be recognized from input observation data;
calculate first scores related to the presence or absence of the composition elements of the identified indication by using an identification device that has been trained in composition elements related to various indications by machine learning;

acquire setting information indicative of a relationship between a type of an indication and presence or absence of composition elements from the memory or outside the memory;

calculate a second score related to a type of the indication based on the acquired setting information and the first scores, wherein the second score is calculated based on a smallest value of the first scores; and identify the type of the indication based on the second score.

* * * * *